Feb. 5, 1963

J. MILLER ET AL 3,076,697

ANALYZER FOR DETERMINING CONCENTRATION
OF COMBUSTIBLES IN GASES

Filed Sept. 11, 1959

INVENTORS
JOSEPH MILLER
PETER STAUDHAMMER
BY
Lilly & Nyhagen
Attorneys

United States Patent Office 3,076,697
Patented Feb. 5, 1963

3,076,697
ANALYZER FOR DETERMINING CONCENTRATION OF COMBUSTIBLES IN GASES
Joseph Miller, Los Angeles, and Peter Staudhammer, Redondo Beach, Calif., assignors to The Regents of the University of California, a corporation of California
Filed Sept. 11, 1959, Ser. No. 839,496
4 Claims. (Cl. 23—254)

This invention deals generally with a means for analyzing gases and particularly with an analyzer for determining the concentration of combustible material in a gas.

The invention is based on the principle that the temperature of a solid body which is heated in the presence of a gas containing combustible material is a function of several variables: the temperature, pressure and composition of the gas; the rate of heat generation, geometry, orientation and composition of the solid body; and the degree of combustion and concentration of the combustible material. If the gas is moving so as to constitute a stream, the mass flow rate of the gas becomes an additional variable to be considered.

By properly fixing, ascertaining or eliminating all of the other variables mentioned, the temperature of the heated body may be directly related to the concentration of combustible material in the gas. This principle is applied in the present invention, briefly, as follows.

Two solid bodies are heated, one in the presence of the gas to be analyzed and the other in the presence of a background or comparison gas which consists of the original gas from which all combustibles have been removed. The method and analyzer of the invention are so organized that all of the mentioned variables except combustibles concentration are eliminated whereby any rise in the temperature of the body which is heated in the presence of the original gas above that of the body which is heated in the presence of the comparison gas is directly related to the concentration of combustible material in the original gas. The temperatures of the two heated bodies are compared to obtain their temperature differential which is then equated to the combustible concentration of the original gas.

With the foregoing preliminary discussion in mind, a broad object of the invention is to provide a means for analyzing a gas to determine the concentration of any combustible material in the gas.

A more specific object of the invention is to provide a gas analyzer for the purpose described in which accurate measurements of the combustible content of a gas are made possible by the use of a comparison gas which is substantially identical to the test gas except for its combustible content.

Another object of the invention is to provide a gas analyzer of the character described which enables continuous sampling of the gas to be tested.

Yet another object of the invention is to provide a gas analyzer of the character described which has a relatively fast response time and high sensitivity.

A further object of the invention is to provide a gas analyzer of the character described which is constructed entirely of materials immune to contamination by the test gas which would adversely affect the operation of the analyzer and especially its sensitivity and response time.

Yet a further object of the invention is to provide a unique hot wire cell for use in a gas analyzer of the character described.

Other objects, advantages and features of the invention will become readily apparent as the description proceeds.

In the ensuing description, two specific embodiments of the invention are disclosed. The preferred embodiment comprises a parallel flow arrangement in which flow of the gas to be analyzed divides approximately equally between two parallel paths. In one path, the comparison path, the combustibles are removed from the gas to provide a comparison gas sample which is essentially identical, except for combustible content, with the test gas sample flowing through the other path.

The comparison gas and test gas samples flow through separate filament cells, hereinafter referred to as comparison and test cells, respectively, containing the heated bodies, namely, hot filaments or wires, whose temperatures are compared to obtain the concentration of combustible material in the test gas sample.

In the second illustrative embodiment of the invention, the test cell and comparison cell are arranged in series in a single flow line. In this case, essentially all of the combustibles in the test gas sample are removed by combustion in the test cell, or a burner and cooler are included between the two cells, so that the gas flowing through the following comparison cell comprises a combustible-free comparison gas.

The invention will now be described in greater detail by reference to the attached drawings, in which:

FIG. 1 diagrammatically illustrates the present preferred embodiment of the present analyzer;

Figure 1:
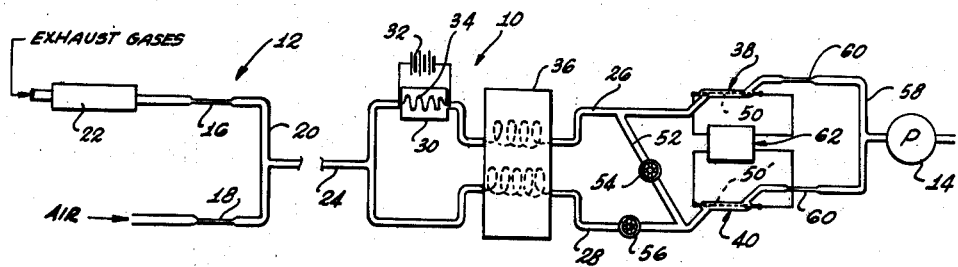

The preferred parallel flow gas analyzer shown in FIG. 1 of the drawings will be seen to comprise a gas flow system 10 having a gas inlet means 12 at one end and means, such as a pump 14, at its other end for producing a flow of gas through the system. The inlet means 12 of the system comprises a pair of gas inlets 16 and 18 at opposite ends of a conduit or gas line 20. As indicated in the drawing, inlet 16 is adapted for connection to the source of the gas to be analyzed, such as the exhaust system 22 of an automotive vehicle. Inlet 18 opens to the atmosphere, or to any uncontaminated source of oxygen.

When the pump 14 is operating, gas and air are drawn into the system 10 through these inlets and merge in a common mixing line 24 leading from the center of the inlet line 20. During flow through this mixing line, the gas and air become thoroughly mixed. The proportion of air required depends on the combustibles concentration being considered. By way of example, a one-to-one ratio was found to be satisfactory for exhaust gas analysis. The air-gas ratio may be fixed by providing the inlets 16 and 18 with any suitable flow regulating means. Capillary tubes provide a simple and inexpensive flow regulating means for this purpose. For this reason, the inlets 16 and 18 have been illustrated as comprising capillaries. In some cases, the inlets 16 and 18 may comprise sonic flow orifices, leading to a low pressure system. Also, in some cases wherein the test gas contains sufficient oxygen, additional air is not required, in which case inlet 18 may be eliminated. This also applied to the hereinafter described embodiment of FIG. 4.

It will be immediately evident that the final reading of concentration of combustible material in the test gas which is obtained with the analyzer must be corrected for this dilution of the original gas by secondary air. Thus, if the air is mixed with the original gas in a one-to-one ratio, the actual concentration of combustible material in the gas will be double the combustibles concentration in the air-gas mixture.

Extending from the outlet end of the mixing line 24 are a pair of parallel branch lines or flow paths 26 and 28. Line 26 has a combustion chamber 30 proximate to the mixing line 24 enclosing a burner 32. This burner may be constructed in various ways but preferably comprises a Vycor tubing wound with a platinum wire filament which is energized from a voltage source 34.

The burner is designed to raise the temperature of the gas flowing through the combustion chamber 30 sufficiently to effect substantially complete combustion of the combustible material contained therein. In exhaust gas studies conducted with the illustrated analyzer, a temperature of 1000° centigrade was found sufficient for this purpose.

The combusted gas discharging from the combustion chamber 30 provides a background or comparison gas sample which is substantially identical to the uncombusted test gas sample flowing through the branch line 28 except, of course, for the higher temperature of and the lack of combustible material in the comparison sample. The comparison sample and the test sample flow through a cooler such as a water cooled heat exchanger 36 which equalizes the temperatures of the two samples.

It is conceivable that the combustibles may be removed from the comparison sample by techniques other than combustion, such as by absorption. If the latter technique is used, it may be unnecessary to cool the comparison sample.

Figure 2:
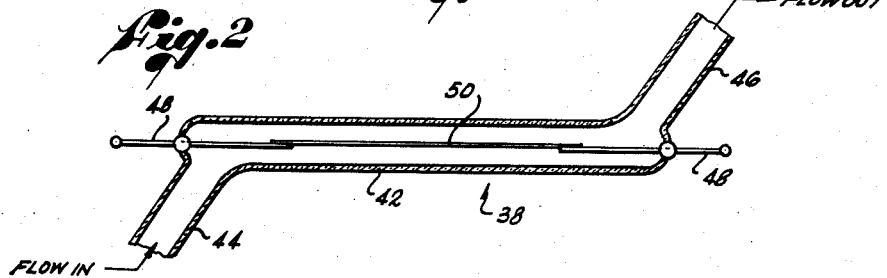
FIG. 2 is an enlarged detail in section of one of the filament cells which is used in the analyzer of FIG. 1.

Located in the branch lines 26 and 28 beyond the heat exchanger are filament cells 38 and 40 which contain the heated bodies or filaments whose temperatures are compared to determine the concentration of combustibles in the test sample. Cells 38 and 40 are identical so that it is necessary to describe only one cell in detail, namely, cell 38, illustrated in FIG. 2.

Cell 38, the comparison cell, comprises a cylindrical housing 42, such as a Pyrex tube, having a transverse inlet 44 at one end and a diametrically opposed, transverse outlet 46 at the other end. The cell is connected in the branch line 26, as shown, so that the comparison gas discharging from the heat exchanger 36 enters the cell inlet 44, flows longitudinally through the cell housing 42, and then discharges through the outlet 46.

Rigidly fixed in the closed ends of the cell housing are two platinum wire supports or terminals 48. One end of each of these terminals is located outside of the housing 42 to permit electrical connections to be made with the terminals, as will soon be described. Welded to and extending between the inner ends of the terminals is an extremely fine platinum filament or wire 50. The comparison gas thus flows longitudinally along the wire 50 during its passage through the cell.

As mentioned, cell 40, the test cell, is identical in every respect to the comparison cell 38, just described. The test cell 40 is connected in the branch line 28 so that the uncombusted, test gas sample discharging from the heat exchanger 36 flows through the test cell and longitudinally over the wire 50' in the cell.

Between the heat exchanger 36 and the cells 38 and 40, the branch lines 26 and 28 are interconnected through a crossline 52. This crossline, and the branch line 28, have stop cocks 54 and 56, the stop cock in the branch line being located just ahead of the point of connection of the crossline 54 with the branch line. As will presently be seen, the crossline and stop cocks provide a means for "zeroing" the analyzer prior to a test run.

As shown in the drawings, branch lines 26 and 28 connect to a common discharge line 58 extending to the intake of pump 14. Located in the branch lines, just ahead of this common discharge line, are a pair of flow control means 60 for maintaining the rates of gas flow through the branch lines equal, as is essential to accurate test results in the illustrated parallel flow arrangement. Flow control means 60 may comprise any suitable flow regulating means for maintaining a constant rate of gas flow through the branch passages. One extremely simple and economical means for this purpose comprise capillaries, as shown in the drawings, through which the comparison gas and the test gas samples flow. These capillaries provide, in effect, fixed sonic flow orifices having given critical flow pressures. The pump 14 is designed to have an intake pressure equal to or less than this critical flow pressure so that any fluctuations in the intake pressure of the pump will not be reflected in fluctuations in the rate of gas flow through the branch lines 26 and 28.

Figure 3:
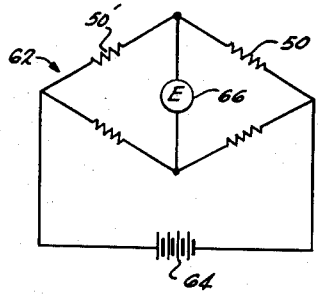
FIG. 3 illustrates in schematic fashion how the filaments in the test and comparison filament cells are connected in a Wheatstone bridge circuit for comparison of the resistances of the filaments.

In normal operation of the analyzer described above, stop cock 54 is closed and stop cock 56 is open so that continuous comparison and test samples flow from the mixing line 24, through the heat exchanger 36, wherein the temperatures of the comparison and test samples are equalized after removal of the combustibles from the comparison sample in the combustion chamber 30, to the test and comparison cells. In these cells, the samples flow longitudinally over the cell wires 50 which are electrically connected in a conventional Wheatstone bridge circuit 62, illustrated in FIG. 3. This bridge circuit is energized by a battery 64.

The voltage of the battery 64 is selected to cause heating of the wires to temperatures in the range of 700° centigrade to 1000° centigrade. At these high temperatures, combustible material in the test gas sample is burned during flow over the wire in the test cell 40. As discussed below, the actual temperatures of the wires 50 and 50' in the comparison cell and the test cell will differ by an amount related to the concentration of the combustible material in the test gas flowing through the test cell 40. The voltage drop E across the bridge is related to the difference in the resistances of the cell wires, which resistances, in turn, are related to the actual temperatures of the wires. The voltage drop E across the bridge thus affords an indication of the concentration of combustible matter in the test gas sample, as will now be discussed.

As preliminarily mentioned, the temperature of a solid body, such as the wire in the cells, which is heated in a stream of gas containing combustible material is a function of several variables but may be directly related to the concentration of combustible material by elimination of the remaining variables. It is evident that if, in the illustrated gas analyzer, the mass flow rate of the test and comparison samples through their respective cells is equalized by the capillary flow control means 60, the temperatures of the samples are equalized by the heat exchanger 36, and the cells 38 and 40 and especially their wires 50 and 50' are identical with respect to geometry, orientation and combustion, then all of the variables, except concentration of combustible material and the degree of combustion, are eliminated. Under these conditions, any temperature differential between the wire 50 in the comparison cell 38 and the wire 50' in the test cell 40 is the result of burning of combustible material in the test cell during flow of the test gas sample over the heated wire in the cell. If the wires in the test and comparison cells are of a material, such as platinum, which exhibits a reproducible variation of resistivity with temperature, the temperature differential may, obviously, be directly related to the concentration of combustible material in the test sample. The voltage E developed across the bridge is related to the difference in resistances of the cell wires and, therefore, to the concentration of combustibles, as already noted. Thus, if an electrical indicating meter 66, connected across the bridge, is properly calibrated, so as to take secondary air dilution and the degree of combustion of the test sample into account, for example, the combustibles concentration may be read directly.

It has been determined that the sensitivity of the hot wire cells is directly proportional to the length of the cell wires and inversely proportional to the square root of the wire radii. In addition, other factors which influence the sensitivity and accuracy of the analyzer, such as heat losses by conduction to the hot wire supports, are improved by making the hot wires longer and finer. Thus, the hot wires should be as fine and as long as practical. For example, wires having a 5 cm. span and diameters as small as .001 inch have been tried. It was found, however, that these extremely fine wires tend to flutter and produce large fluctuations in the analyzer output. For this reason, .005 inch was determined to be the smallest practical size for wires mounted in the way shown in FIG. 2. More sophisticated mounting techniques, such as those employing springs to create a slight strain in the wires, would permit the use of finer wires, such as .001 inch wires, and increase sensitivity.

An experimental form of the apparatus employed test and comparison cells in which long and fine wires were wrapped about ceramic bars so that the wires were appreciably longer than those shown in the illustrated analyzer. The sensitivity of these cells was proportionally higher, but the time response was considerably slower, namely, three to five minutes as opposed to seconds for single wires. This increase in response time is apparently due to the thermal capacitance of the ceramic bars. From this it may be concluded that single straight wires are desirable for use when the response time is critical, while other hot wire configurations, such as wires coiled on ceramic bars, for example, may be employed when the response time is not critical.

Extension of the filament or wire in the cells parallel to the direction of gas flow, as shown, is desirable since progressive heating of the gas occurs as it flows along the wires.

It has also been determined that the higher the temperature of the hot wires, the greater the sensitivity of the test and comparison cells. On the other hand, when the wire temperature is relatively low, the stability of the analyzer is increased. There are, of course, practical limitations to the wire temperature. At all times, the wire temperature must stay well below the point at which failures of any kind, such as evaporation, are significant. This means that the wire temperature must be low enough that the increase in temperature of the wire in the test cell, due to burning of the combustibles in the test gas sample, will not result in the wire temperature reaching the danger zone. It was also determined experimentally that in some cases thermal expansion of the wires placed the wires in close proximity to the inner cell surfaces. The resultant cooling of the center portions of the wires resulted in very marked decreases in sensitivity. Taking all of these factors into consideration, it was experimentally determined that the optimum wire temperature is in the range of 700° centigrade to 1000° centigrade. By way of example, in tests employing samples of 125 parts per million of hexane in air, the most superior conditions were found to prevail with a wire temperature of about 800° centigrade. At this temperature, with the meter 66 having a full scale reading of four millivolts and a .005 inch wire size, platinum cell wires provided an instrument response reproducible to one part per million.

Experimental studies with the present analyzer were conducted using platinum wires. When all things are considered, no material appears to be better suited to use in the present analyzer than platinum. For example, platinum-clad tungsten is commercially available. It was found, however, that the platinum cladding did not serve to protect the tungsten from oxidation and that cell wires from this material oxidized rapidly at the high temperatures.

The cell wall temperature and radius influence the sensitivity of the test cell in two ways. In the first instance, it was found that decreasing the temperature of the cell wall increases the sensitivity markedly, while decreasing the cell radius increases the heat loss from the cell which decreases sensitivity. In the second instance, increasng the radius of the cell wall was found to produce an increase in the temperature change of the wire in the test cell due to combustion in the cell and, therefore, the sensitivity, while increasing the cell wall temperature, has the effect of moving the combustion zone outwardly in the cell and increasing the temperature change in the hot wire.

The most effective cell wall temperature and radius have not been determined. The cell wall radius should be large enough that any bow produced in the cell wire by thermal expansion does not place the wire so close to the cell wall as to affect the analyzer output. Thus, the cell wall should be relatively large, on the order of 0.5 cm.

Insulating the cell walls may be desirable in some cases. Insulation provides the cell with greater stability since it minimizes or eliminates the effects of factors external to the environment of the cell, such as gusts of air, which would cause fluctuation of the analyzer output.

During certain experiments conducted with the present analyzer, the platinum wires in the cells were heated to the evaporation point and the inner cell walls became coated with a thin layer of platinum. Using these coated cells at lower temperatures, where stability is increased, it was found that the sensitivity of the cells was markedly increased. The reason for this is not definitely understood. It is thought, however, that the presence of the platinum at the cell surface acts as a catalyst to the oxidation reaction taking place in the test cell. Thus, the reaction takes place early and adjacent the cell wall, thereby increasing the total temperature rise at the wire due to a given concentration of combustibles. The cell may, therefore, be made more sensitive by coating its inside surface with an oxidation catalyst, such as platinum. This technique would not appear to be appropriate in all applications, however. For instance, an automobile exhaust gas would poison the platinum catalyst with the result that the sensitivity of the instrument would gradually drift in the negative direction as the catalyst was rendered ineffective.

It is preferable, if not necessary, that the entire gas flow system from the inlet capillaries 16 and 18 to the test and comparison cells 38 and 40 be constructed of glass or suitable plastics which are not contaminated by the gas being measured. It has been found, for example, that the presence of such materials as rubber tubing, stop cock grease and dehumidifying agents seriously disturbs the time response of the instrument. Absorption and desorption of combustible material by the walls of the instrument render the latter incapable of detecting small or rapid changes in combustible concentration.

Prior to use, the instrument is "zeroed" by opening stop cock 54 and closing stop cock 56 so that comparison gas flows through both cells 38 and 40. Meter 66 is then adjusted to read zero.

Figure 4:
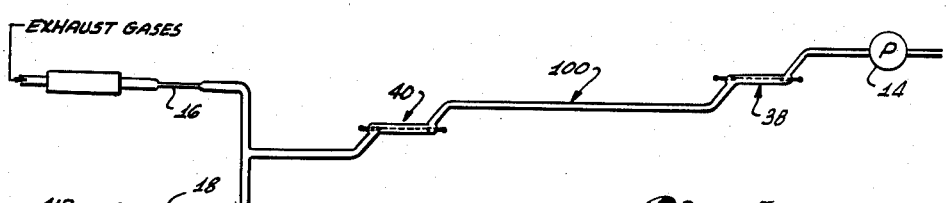
FIG. 4 diagrammatically illustrates the series cell arrangement of the analyzer.

Reference is now made to FIG. 4 illustrating a modified version of the present analyzer. In this modified analyzer, a single flow path or gas line 100 is employed. The test cell 40 and comparison cell 38 are arranged in series in this line, flow through the line being produced by a pump 14. In this case, the gas sample drawn through the inlet 16 and the air drawn into the inlet 18 are mixed in the section of the line ahead of the test cell 40. The wire in this cell is heated sufficiently to produce complete combustion of the combustible material in the gas flowing through the cell. As a result, the gas emerging from the cell provides a comparison gas similar to that emerging from the combustion chamber 30 in FIG. 1. Alternatively, the gas sample need not be completely combusted in test cell 40, combustion being completed by a burner, such as burner 30 of FIG. 1, located in line 100 between the two cells, this burner being followed by a cooler, such as the cooler 36 of FIG. 1. This comparison gas flows through the comparison cell 38.

The wires in the cells will be connected in a Wheatstone bridge circuit, as before. It is evident that in this modified series cell arrangement of the analyzer, the concentration of combustible material in the test gas may be determined by measuring the difference in resistances of the cell wires, as before. Obviously, the cells must be operated at a higher temperature in order to provide complete combustion of the combustible materials in the test cell.

The analyzer of FIG. 1 possesses at least two advantages over the analyzer of FIG. 4, however. First, since complete combustion need not occur in the test cell 40 in the parallel flow analyzer, the cell operating temperatures can be lower with a resultant increase in the stability of the analyzer output. Secondly, in the instrument of FIG. 1, any changes in the composition of the gas being analyzed affect the test and comparison cells approximately simultaneously. In the series instrument of FIG. 4, on the other hand, there is obviously a time lag between the effect of a change in gas composition on the test cell and the effect of the same change on the comparison cell.

In the preferred embodiments of the invention, the flow conditions, heat transfer and geometrical configurations have been maintained substantially equal in the two cells. It will be appreciated, however, that this is not an inherent requirement, since these conditions at one cell may be scaled up or down from those at the other.

It is apparent that there has been described and illustrated a gas analyzer and a method of gas analysis for determining the concentration of combustible materials in a gas which are fully capable of attaining the objects and advantages preliminarily set forth.

What is claimed is:

1. A combustion analyzer for gases containing insufficient oxygen to support combustion of combustibles in the gases comprising a gas flow system having separate gas and oxygen inlet means at one end and an outlet at the other end, means for producing a flow of oxygen and gas to be analyzed into the system through said inlet means, said flow system also including a single mixing line communicating both of said inlet means to the outlet and through which gas and oxygen entering said inlet means flow for intermixing thereof and a pair of parallel branch lines connecting said mixing line and outlet, means in one branch line to remove the combustibles from the gas-oxygen mixture in that line, a comparison filament cell in said one line beyond said combustible removing means, a test filament cell in the other branch line, a filament in each cell, means for heating said filaments at given rates of heat generation, and means for comparing the temperatures of the filaments.

2. A combustibles analyzer for measuring the concentration of combustibles in a gas, comprising: a flow system through which the gas is adapted to pass; means in said system for effecting combustion of the gas to produce a comparison gas from which the combustibles are removed and comparing the original gas containing the combustibles with the comparison gas; a first combustion cell in said system through which the original gas flows; a second combustion cell in said system through which the comparison gas flows; a filament in each cell; means for passing electrical current through said filaments to heat the latter to given rates of heat generation sufficient to cause combustion of the original gas in said first cell; means for measuring the difference in the electrical resistance of said filaments; and means for equalizing the temperatures of the original gas and the comparison gas before they enter said cells, respectively.

3. A combustibles analyzer for measuring the concentration of combustibles in a gas, comprising: a flow system through which the gas is adapted to pass; means in said system for effecting combustion of the gas to produce a comparison gas from which the combustibles are removed; a first combustion cell in said system through which the original gas flows; a second combustion cell in said system through which the comparison gas flows; a filament in each cell; means for passing electrical currents through said filaments to heat the latter to given rates of heat generation sufficient to cause combustion of the original gas in said first cell; means for measuring the difference in the electrical resistance of said filaments; and a heat exchanger through which the original gas flows to said first cell and the comparison gas flows to said second cell for equalizing the temperatures of the original gas and the comparison gas just before they enter the cells, respectively.

4. A combustibles analyzer for measuring the concentration of combustibles in a gas, comprising: a flow system through which said gas is adapted to pass including a single inlet line through which the gas entering the system initially flows and two parallel branch lines connected with said single line which divide the gas flow emerging from said inlet line; a heat exchanger through which said branch lines pass; means in one branch line between said inlet line and heat exchanger for effecting combustion of the gas flowing through said one branch line to produce comparison gas from which the combustibles are removed; a first combustion cell in said one branch line through which said comparison gas flows; a second combustion cell in the other branch line through which the original gas in the other branch line flows; a filament in each cell; means for passing electrical currents through said filaments to heat the latter to given rates of heat generation; and means for measuring the electrical resistances of said filaments.

References Cited in the file of this patent

UNITED STATES PATENTS

| | | |
|---|---|---|
| 2,042,646 | Willenborg | June 2, 1936 |
| 2,757,362 | Gutkowski | July 3, 1956 |
| 2,857,251 | Krogh | Oct. 21, 1958 |
| 2,888,330 | Kapff | May 26, 1959 |
| 2,892,684 | King | June 30, 1959 |
| 2,921,841 | Gerrish | Jan. 19, 1960 |

FOREIGN PATENTS

| | | |
|---|---|---|
| 1,019,941 | France | Nov. 12, 1952 |